(12) United States Patent
Avis et al.

(10) Patent No.: US 10,458,278 B2
(45) Date of Patent: Oct. 29, 2019

(54) APPARATUS AND METHOD FOR PROVIDING FLUID TO A BEARING DAMPER

(71) Applicant: UNITED TECHNOLOGIES CORPORATION, Farmington, CT (US)

(72) Inventors: Thomas Bruce Avis, Manchester, CT (US); Francis Parnin, Suffield, CT (US); Michael Dreher, Prospect, CT (US); James S. Elder, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 251 days.

(21) Appl. No.: 15/344,195

(22) Filed: Nov. 4, 2016

(65) Prior Publication Data

US 2018/0128124 A1    May 10, 2018

(51) Int. Cl.
*F01D 25/18*    (2006.01)
*F01D 5/02*    (2006.01)
(Continued)

(52) U.S. Cl.
CPC ............. *F01D 25/18* (2013.01); *F01D 5/02* (2013.01); *F01D 19/00* (2013.01); *F01D 25/16* (2013.01);
(Continued)

(58) Field of Classification Search
CPC . F01D 25/18; F01D 5/02; F01D 19/00; F01D 25/16; F01D 25/164; F01D 25/166; F01D 25/20; F16C 27/045
See application file for complete search history.

(56) References Cited

U.S. PATENT DOCUMENTS 4,947,639 A  *  8/1990  Hibner ................. F01D 25/164
                                                                    384/535
4,983,051 A  *  1/1991  Hibner ................. F01D 25/164
                                                                    184/6.11
(Continued)

FOREIGN PATENT DOCUMENTS

EP    2258929 A2    12/2010
EP    2662537 A2    11/2013
GB    2218751 A     11/1989

OTHER PUBLICATIONS

European Search Report for Application No. 17199700.0, dated Mar. 23, 2018; 8 pages.

*Primary Examiner* — Michael A Riegelman
(74) *Attorney, Agent, or Firm* — Cantor Colburn LLP (57) ABSTRACT

Disclosed is a lubricant supply system for a plurality of bearing dampers in a plurality of engine bearing compartments of a gas turbine engine, including a lubricant supply conduit, a first lubricant delivery conduit fluidly coupled to the supply conduit, the first delivery conduit including one or more lubricant delivery flow paths and delivering lubrication to engine components, a second lubricant delivery conduit fluidly coupled to the supply conduit, the second delivery conduit delivering lubricant to one or more of the plurality of bearing dampers, and an active oil flow management valve, selectively restricting lubricant flow in the first delivery conduit, increasing pressure in the second delivery conduit, based on an engine shaft rotational speed.

10 Claims, 4 Drawing Sheets (51) Int. Cl.
*F01D 25/16* (2006.01)
*F01D 19/00* (2006.01)
*F01D 25/20* (2006.01)
*F16C 27/04* (2006.01)

(52) U.S. Cl.
CPC ......... *F01D 25/164* (2013.01); *F01D 25/166* (2013.01); *F01D 25/20* (2013.01); *F16C 27/045* (2013.01); *F05D 2220/32* (2013.01); *F05D 2260/96* (2013.01); *F05D 2270/01* (2013.01); *F05D 2270/304* (2013.01); *F16C 2360/23* (2013.01)

(56) References Cited

U.S. PATENT DOCUMENTS

| | | | | |
|---|---|---|---|---|
| 5,110,257 A * | 5/1992 | Hibner | ............... | F01D 25/164 |
| | | | | 415/119 |
| 5,839,268 A * | 11/1998 | Morris | ............... | F01D 25/164 |
| | | | | 60/772 |
| 7,500,788 B2 * | 3/2009 | Joyner | ............... | B60K 17/24 |
| | | | | 384/448 |
| 8,230,974 B2 * | 7/2012 | Parnin | ............... | F01D 25/18 |
| | | | | 184/6.11 |
| 2003/0230274 A1 * | 12/2003 | Williams | ............... | F01M 1/02 |
| | | | | 123/196 R |
| 2013/0022446 A1 * | 1/2013 | Chevillot | ............... | F01D 25/164 |
| | | | | 415/1 |
| 2013/0280043 A1 * | 10/2013 | Parnin | ............... | F01D 25/18 |
| | | | | 415/118 |
| 2013/0318940 A1 * | 12/2013 | Parnin | ............... | F02C 7/06 |
| | | | | 60/39.08 |
| 2014/0150439 A1 * | 6/2014 | Parnin | ............... | F02C 7/06 |
| | | | | 60/772 |
| 2016/0215652 A1 * | 7/2016 | Mastro | ............... | F01D 25/20 |
| 2016/0305284 A1 * | 10/2016 | Mastro | ............... | F01D 25/20 |
| 2016/0312699 A1 * | 10/2016 | Teicholz | ............... | F02C 7/06 |
| 2017/0114662 A1 * | 4/2017 | Mastro | ............... | F01D 25/20 |
| 2017/0234158 A1 * | 8/2017 | Savela | ............... | F02K 3/06 |
| | | | | 416/1 |
| 2018/0073395 A1 * | 3/2018 | Parnin | ............... | F01D 15/12 |
| 2018/0128124 A1 * | 5/2018 | Avis | ............... | F01D 5/02 |
| 2018/0230854 A1 * | 8/2018 | Parnin | ............... | F01D 25/18 |
| 2018/0283211 A1 * | 10/2018 | Parnin | ............... | F01D 19/00 |
| 2018/0306062 A1 * | 10/2018 | Avis | ............... | F16N 7/02 |

* cited by examiner

APPARATUS AND METHOD FOR PROVIDING FLUID TO A BEARING DAMPER

BACKGROUND

This disclosure relates to gas turbine engines, and more particularly to an apparatus and method for providing fluid to a bearing damper of the gas turbine engine.

Gas turbine engines are used in numerous applications, one of which is for providing thrust to an aircraft. When a gas turbine engine of an aircraft has been shut off for example, after an aircraft has landed at an airport, the engine is hot and due to heat rise, the upper portions of the engine will be hotter than lower portions of the engine. When this occurs thermal expansion may cause deflection of components of the engine which may result in a "bowed rotor" condition. When starting an engine with a "bowed rotor" condition, a resulting significant rotational imbalance can excite fundamental modes of components of the engine. This in turn produces excessive deflections of the engine rotor, while bowing of the engine case can result in a reduction in normal build clearances and thus results in a potential for rubbing between the rotating turbomachinery and the closed-down case structure. The rub condition can result in a hung start or a performance loss in the turbomachinery.

Accordingly, it is desirable to provide a method and/or apparatus for providing fluid to a bearing damper of a gas turbine engine.

BRIEF DESCRIPTION

Disclosed is a lubricant supply system for a plurality of bearing dampers in a plurality of engine bearing compartments of a gas turbine engine, comprising: a lubricant supply conduit; a first lubricant delivery conduit fluidly coupled to the supply conduit; the first delivery conduit including one or more lubricant delivery flow paths, and delivering lubrication to engine components; a second lubricant delivery conduit fluidly coupled to the supply conduit; the second delivery conduit delivering lubricant to one or more of the plurality of bearing dampers; an active oil flow management valve, wherein actuation of the active oil flow management valve restricts lubricant flow in the first delivery conduit and increases pressure in the second delivery conduit; and wherein actuation of the active oil flow management valve is dependent upon a rotational speed of an engine spool.

In addition to one or more of the features described above, or as an alternative, further embodiments may include that the active flow management valve restricts lubricant flow to the first delivery conduit when an engine spool rotational speed is below a preselected rotational speed.

In addition to one or more of the features described above, or as an alternative, further embodiments may include that the active flow management valve restricts lubricant flow to the first delivery conduit when an engine spool rotational speed is below idle speed.

In addition to one or more of the features described above, or as an alternative, further embodiments may include that the restriction to the first delivery conduit is partial.

In addition to one or more of the features described above, or as an alternative, further embodiments may include that the active flow management valve is a solenoid valve that is normally open and, when closed, restricts lubricant flow in the first delivery conduit.

In addition to one or more of the features described above, or as an alternative, further embodiments may include a pressure sensor operatively coupled to the active oil flow management valve, the pressure sensor being located in the second conduit.

Also disclosed is a gas turbine engine including: a plurality of bearing compartments respectively including a plurality of bearing dampers; a lubricant supply system for supplying lubricant to one or more of the a plurality of bearing dampers, comprising: a lubricant supply conduit; a first lubricant delivery conduit fluidly coupled to the supply conduit; the first delivery conduit including one or more lubricant delivery flow paths, and delivering lubrication to engine components; a second lubricant delivery conduit fluidly coupled to the supply conduit; the second delivery conduit delivering lubricant to one or more of the plurality of bearing dampers; an active oil flow management valve, wherein actuation of the active oil flow management valve restricts lubricant flow in the first delivery conduit and increases pressure in the second delivery conduit; and wherein actuation of the active oil flow management valve is dependent upon a rotational speed of an engine spool.

In addition to one or more of the features described above, or as an alternative, further embodiments may include that the active flow management valve restricts lubricant flow to the first delivery conduit when an engine spool rotational speed is below a preselected rotational speed.

In addition to one or more of the features described above, or as an alternative, further embodiments may include that the active flow management valve restricts lubricant flow to the first delivery conduit when an engine spool rotational speed is below idle speed.

In addition to one or more of the features described above, or as an alternative, further embodiments may include that the active flow management valve is a solenoid valve that is normally open and, when closed, restricts lubricant flow in the first delivery conduit.

In addition to one or more of the features described above, or as an alternative, further embodiments may include that the restriction to the first delivery conduit is partial.

In addition to one or more of the features described above, or as an alternative, further embodiments may include a pressure sensor operatively coupled to the active oil flow management valve, the pressure sensor being located in the second conduit.

Further disclosed is a method of supplying lubricant to one or more bearing dampers in a respective one or more of bearing compartment of a gas turbine engine, comprising: sensing a rotational speed of an engine spool during an engine starting sequence; restricting flow in a first lubricant delivery conduit and increasing pressure in a second lubricant delivery conduit by engaging an active oil flow management valve when a rotational speed of a spool is below a preselected threshold; decreasing pressure in the second lubricant delivery conduit by disengaging the active oil flow management valve when a rotational speed of the spool is greater than a preselected threshold.

In addition to one or more of the features described above, or as an alternative, further embodiments may include that the active flow management valve is a solenoid valve that is normally open and, when closed, restricts lubricant flow in the first delivery conduit.

In addition to one or more of the features described above, or as an alternative, further embodiments may include sensing pressure in the first lubricant delivery conduit, after disengaging the active flow management valve when the rotational speed of the spool is greater than the preselected threshold, to confirm the active flow management valve is open.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
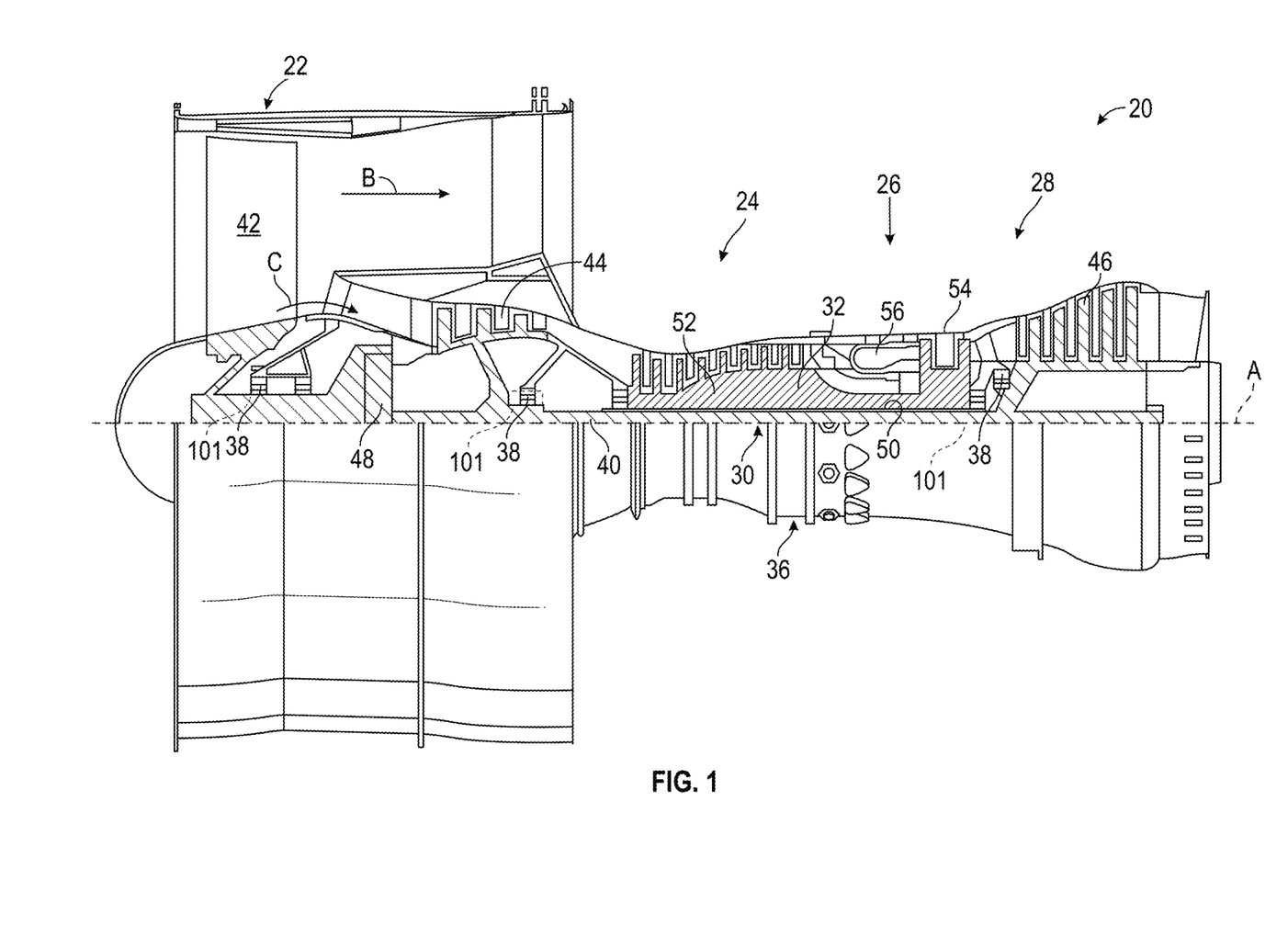
FIG. 1 is cross section of a disclosed gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing compartments 38. It should be understood that various bearing compartments 38 at various locations may alternatively or additionally be provided, and the location of bearing compartments 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing compartments 38 in the turbine section 28. The inner shaft 40 and the outer shaft 50 are concentric and rotate via bearing compartments 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Various embodiments of the present disclosure are related to a damping system in a gas turbine engine. To assist in minimizing the potential and impact of a bowed rotor start response, a gas turbine engine employs one or more fluid film/squeeze-film dampers in bearing supports to provide viscous type damping and dissipation of the bowed rotor excitation energy as well as other sources of vibration. However, at low speeds where bowed rotor modes occur in the operating range, the dampers may not always be filled sufficiently with oil or fully pressurized so that the dampers may not be providing sufficient or optimal damping to counteract the bowed rotor response. Additionally, as the oil pumps are typically driven by rotation of the engine, oil pumps used to lubricate and dampen vibrations within a gas turbine engine may not provide sufficient oil pressure at startup and at low speeds.

For example, during the first few moments, or even tens of seconds, at startup, the low spool, fan drive gear system and fan are not yet spinning, while the high spool is spooling up. The engine with bowed rotors, without proper damping, may experience rotor vibration on the order of a few mils. This could be significant enough to create unacceptable blade rub in the turbine or compressor case. With high spool rotation being on the order of a few thousand rpms, rather than tens of thousands during, e.g., at takeoff, the pressure in the lubrication system is insufficient to provide proper dampening at the bearing dampers in the high spool 32.

A solution to the above challenge, detailed below, is to further pressurize oil conduits for the bearing damper in the high spool by restricting, partially or completely, oil to systems that are not yet spinning, for the duration in which there is no spin. That is, for the first few tens of seconds at start, a solution is redirecting part or all of the engine lubricant feed to the high spool, so that the high pressure spool 32 is capable of achieving proper damping. At start up, with the pressure in the high spool lubricant conduits normally in the few tens of pounds per square inch (PSI), the disclosed system has the capability of increasing the pressure to the bearing damper by a multiple of two or more.

With reference to FIG. 1, the bearing damper 101 for the high pressure spool 32 is fed by the oil feed line that supplies oil to the rest of the bearing compartments 38. The bowed rotor in the high pressure spool 32, caused by heat rising inside the engine 20 during heat soak after shutdown, can cause the imbalance during the next engine start. As indicated, the imbalance in the high pressure spool 32 can cause blades to contact the cases during a bowed rotor start which can then lead to loss of stall margin.

As noted, the bearing damper 101 in the high pressure spool 32 can mitigate imbalance in the rotor. The damper in the high pressure spool 32, as identified, may be ineffective at start, due to low oil pressure, because oil pressure is driven by the engine rotor shaft which slowly spools up. Therefore, with the damper 101 in the high pressure spool 32 failing at startup to adequately dampen out the imbalance caused by the bowed rotor, start times are purposely longer to prevent rubbing blades out.

Turning now to FIGS. 1-4, a lubricant supply system 100 for a plurality of bearing dampers 101 in a plurality of engine bearing compartments 38 of a gas turbine engine is disclosed. Non-limiting locations of bearing dampers 101 are illustrated schematically by dashed lines in FIG. 1. The bearing compartment 38 rotatably supports an engine component.

Figure 2:
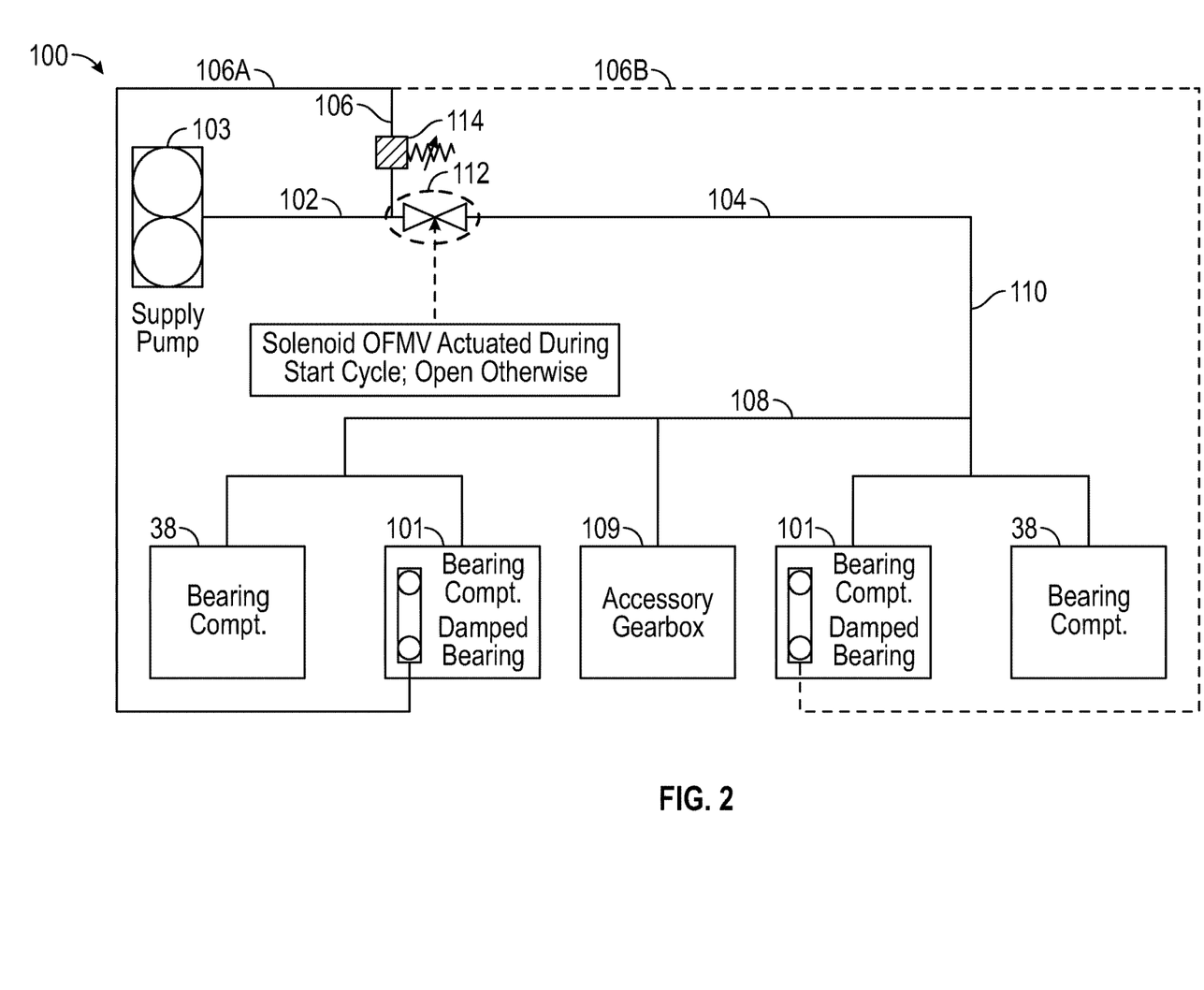
FIG. 2 illustrates a schematic of a system for providing fluid to a bearing damper in a gas turbine engine according to a disclosed embodiment, the system having an active oil flow management valve in a non-actuated position.
Figure 3:
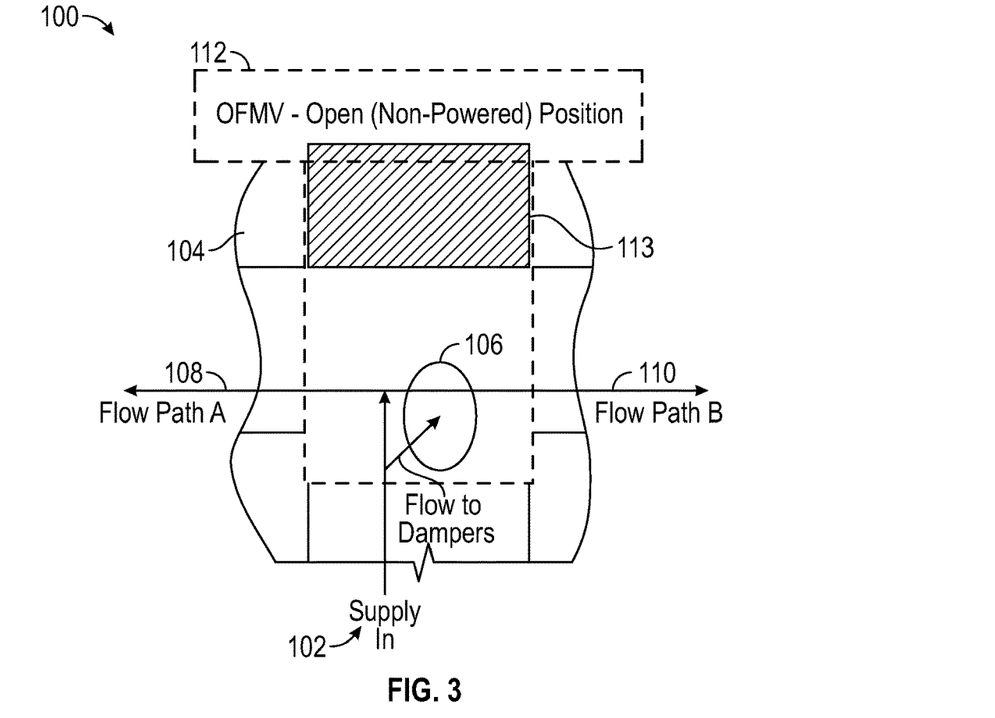
FIG. 3 illustrates the turbine bearing damper configuration of FIG. 2, wherein the active oil flow management valve is in an open position.
Figure 4:
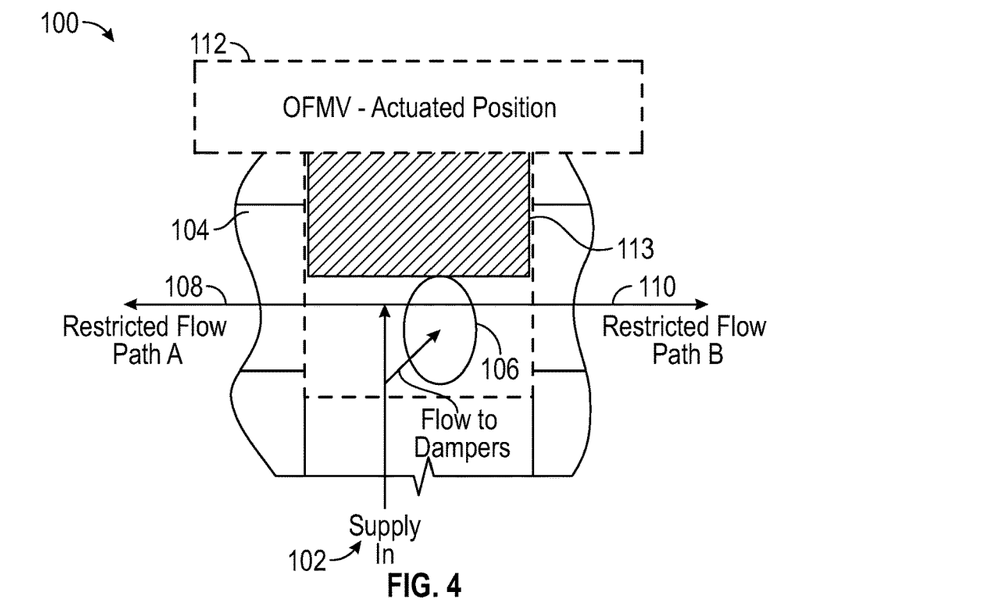
FIG. 4 illustrates the turbine bearing damper configuration of FIG. 2, wherein the active oil flow management valve is in an actuated position.

In one embodiment, the lubricant supply system 100 includes a lubricant supply conduit 102, fed by a supply pump 103, and a first lubricant delivery conduit 104 fluidly coupled to the supply conduit 102. The first delivery conduit 104 includes one or more lubricant delivery flow paths 108, 110 and delivers lubricant to engine components, including bearing compartments 38 and, for example, an accessory gearbox 109. A second lubricant delivery conduit 106 may be fluidly coupled to the supply conduit 102. The second delivery conduit 106 delivers lubricant to one or more of the plurality of bearing dampers 101 via, e.g. branches 106A, 106B.

According to an embodiment, an active oil flow management valve 112 is disclosed. Actuation of the active oil flow management valve 112 restricts lubricant flow in the first delivery conduit 104 and increases pressure in the second delivery conduit 106, to both branches 106A and 106B, to the damped bearings 101. It is to be noted that, as illustrated in FIG. 2, damped bearings 101 always receive at least a minimum amount of lubricant via conduit 106. In the illustrated embodiment, valve 112 is between the pump 103 and valve 112. In one embodiment, however, the valve 112 can have an opening though which conduit 106 is continuously fed. During a start cycle, the conduit 106 receives additional oil, at the expense of other systems, e.g., the low spool, while the high spool is winding up. During this period, the dampers 101 are supplied with the minimum amount of oil.

Actuation of the active oil flow management valve 112 is dependent upon a rotational speed of an engine spool 30. In one embodiment, the active flow management valve 112 restricts lubricant flow to the first delivery conduit 104 when an engine spool 30 rotational speed is below a preselected rotational speed. In one embodiment, the active flow management valve 112 restricts lubricant flow to the first delivery conduit 104 when an engine spool 30 rotational speed is below idle speed. In one embodiment, the active flow management valve 112 is a solenoid valve that is normally open and, when closed, restricts lubricant flow in the first delivery conduit 104. That is, when engaged, the solenoid spring force is overcome and the valve closes to direct a greater volume of lubricant into the second conduit 106. When disengaged, the valve spring force retracts the valve seat 113, and lubricant again flows through the normal flow paths in the first delivery conduit 104.

In one embodiment, a pressure sensor 114 (FIG. 2) is operatively coupled to the active oil flow management valve 112. The pressure sensor 114 is located in the second lubricant delivery conduit 106. In one embodiment, the lubricant supply system 100 is used to supply lubricant to at least one bearing damper 101 of one of the plurality of bearing compartments 38 in the engine 20.

In addition, the valve seat illustrated in FIG. 3 can be contoured to provide at least a certain amount of lubricant flow to one of the flow paths A or B when the valve is closed. This configuration could be used where certain systems are disposed on one of the flow paths which need oil at start. Alternatively, the valve seat may close partially, even at maximum activation, and orifices in the lubricant conduits can provide for further restricting the flow to the paths A and B at differential rates.

Figure 5:
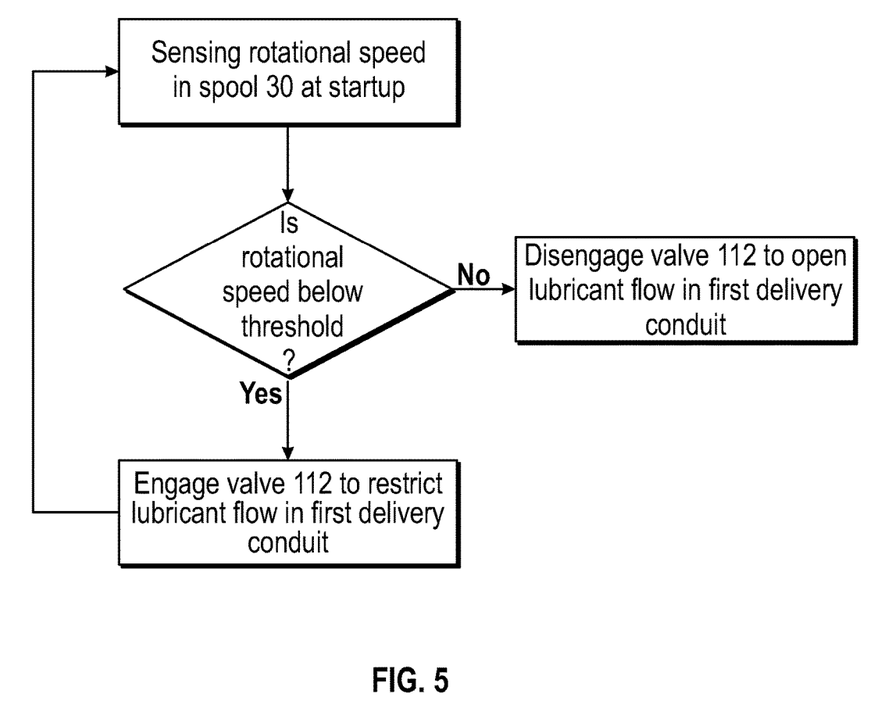
FIG. 5 illustrates a method for providing fluid to a bearing damper.

As illustrated in FIG. 5, a method of supplying lubricant to one or more bearing dampers 101 in a respective one or more engine bearing compartments 38 of a gas turbine engine is disclosed. The method includes sensing a rotational speed of an engine spool 30 during an engine starting sequence. The method further includes restricting flow in a first lubricant delivery conduit 104 and increasing pressure in a second lubricant delivery conduit 106 by engaging an active oil flow management valve 112 when a rotational speed of a spool 30 is below a preselected threshold. Additionally, the method includes decreasing pressure in the second lubricant delivery conduit 106 by disengaging the active oil flow management valve 112 when a rotational speed of the spool 30 is greater than a preselected threshold.

Restricting the flow for a short duration to the primary flow path does not result in an appreciable degradation of use of the engine components. In comparison, increasing flow to the damper helps reduce the potential adverse effects of rotor vibration imbalances. In addition, an active valve configuration is desirable compared with, e.g., a passive valve. A passive valve is more likely to engage during flight conditions in which flow to the primary path needs to remain constant and/or enhanced flow to the bearing damper is unnecessary.

During startup, when the engine spool has yet to reach a speed that provides requisite pressure to the lubrication system, flow is diverted to the damper path. Once at idle, i.e., after startup, normal oil flows are provided in the engine lubrication system.

According to the above embodiments, a dedicated damper supply tube is provided that takes advantage of higher pressure oil during start. An active oil flow management valve boosts pressure during start by reducing flow to the rest of the engine, sending it to the damper, where it is needed. To actuate the valve, an active solenoid has been disclosed, which prevents actuation at undesirable engine operation points. A detection method, such as a pressure sensor, has been disclosed, which ensures the oil flow management valve is in the correct position during the engine operation.

That is, when the valve engages and the valve seat closes, e.g., before the spools have spun up to speed, pressure in the damper supply conduit will increase, which will register in the sensor. This will confirm that the valve is operating properly, and the valve seat is in the closed position. Similarly, when the valve disengages and the valve seat opens, e.g., after the spools have spun up to speed, pressure in the damper supply conduit will drop, which will register in the sensor. This will confirm that the valve is operating properly, and the valve seat is in the opened position.

To minimize impacts to the lube system distribution, the oil flow management valve is designed to plunge into the existing flow passage to partially block the main flow paths. This back pressures the system, increasing the pressure going to the dampers and reduces flow to the rest of the engine. The engine can tolerate reduced flow for a period of time. The active oil flow management valve is actuated to an open state before the engine reaches idle, returning the lubrication system to the normal, in flight operation mode.

The above configuration changes how the lubrication system performs during start and reverts the lubrication system for the rest of the engine operation. The increased pressure enables the bearing dampers on the high spool to function more effectively in counteracting the imbalance caused by a bowed rotor. The damped out vibrations will allow the engine to achieve idle in a shorter amount of time, without damage caused by blade rub out.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lubricant supply system for a plurality of bearing dampers in a plurality of engine bearing compartments of a gas turbine engine, comprising:
    a lubricant supply conduit;
    a first lubricant delivery conduit fluidly coupled to the supply conduit;
    the first delivery conduit including one or more lubricant delivery flow paths, and delivering lubrication to engine components;
    a second lubricant delivery conduit fluidly coupled to the supply conduit;
    the second delivery conduit delivering lubricant to one or more of the plurality of bearing dampers;
    an active oil flow management valve, wherein actuation of the active oil flow management valve restricts lubricant flow in the first delivery conduit and increases pressure in the second delivery conduit;
    wherein actuation of the active oil flow management valve is dependent upon a rotational speed of an engine spool, and
    wherein the active flow management valve is a solenoid valve that is normally open and, when closed, restricts lubricant flow in the first delivery conduit.

2. The system of claim 1, wherein the active flow management valve restricts lubricant flow to the first delivery conduit when an engine spool rotational speed is below a preselected rotational speed.

3. The system of claim 1, wherein the active flow management valve restricts lubricant flow to the first delivery conduit when an engine spool rotational speed is below idle speed.

4. The system of claim 3, where the restriction to the first delivery conduit is partial.

5. The system of claim 1, further comprising a pressure sensor operatively coupled to the active oil flow management valve, the pressure sensor being located in the second conduit.

6. A gas turbine engine including:
    a plurality of bearing compartments respectively including a plurality of bearing dampers;
    a lubricant supply system for supplying lubricant to one or more of the a plurality of bearing dampers, comprising:
    a lubricant supply conduit;
    a first lubricant delivery conduit fluidly coupled to the supply conduit;
    the first delivery conduit including one or more lubricant delivery flow paths, and delivering lubrication to engine components;

a second lubricant delivery conduit fluidly coupled to the supply conduit;

the second delivery conduit delivering lubricant to one or more of the plurality of bearing dampers;

an active oil flow management valve, wherein engaging the active oil flow management valve restricts lubricant flow in the first delivery conduit and increases pressure in the second delivery conduit;

wherein engaging of the active oil flow management valve is dependent upon a rotational speed of an engine spool; and wherein the active flow management valve is a solenoid valve that is normally open and, when closed, restricts lubricant flow in the first delivery conduit.

7. The engine of claim 6, wherein the active flow management valve restricts lubricant flow to the first delivery conduit when an engine spool rotational speed is below a preselected rotational speed.

8. The engine of claim 6, wherein the active flow management valve restricts lubricant flow to the first delivery conduit when an engine spool rotational speed is below idle speed.

9. The engine of claim 6, where the restriction to the first delivery conduit is partial.

10. The engine of claim 6, further comprising a pressure sensor operatively coupled to the active oil flow management valve, the pressure sensor being located in the second conduit.

\* \* \* \* \*